Dec. 21, 1965     D. W. NAGEL     3,224,092

CARPET CUTTING MACHINE

Filed Feb. 21, 1963     5 Sheets-Sheet 1

INVENTOR.
DONOVAN W. NAGEL

BY

*H. Keith Schoff*

ATTORNEY

Dec. 21, 1965  D. W. NAGEL  3,224,092
CARPET CUTTING MACHINE
Filed Feb. 21, 1963  5 Sheets-Sheet 3

INVENTOR.
DONOVAN W. NAGEL
BY
H. Keith Schoff
ATTORNEY

INVENTOR.
DONOVAN W. NAGEL
BY
H. Keith Schoff
ATTORNEY

Dec. 21, 1965     D. W. NAGEL     3,224,092
CARPET CUTTING MACHINE

Filed Feb. 21, 1963     5 Sheets-Sheet 5

INVENTOR.
DONOVAN W. NAGEL
BY
ATTORNEY

United States Patent Office 3,224,092
Patented Dec. 21, 1965

3,224,092
CARPET CUTTING MACHINE
Donovan W. Nagel, 5309 Joylynne Drive, Madison, Wis.
Filed Feb. 21, 1963, Ser. No. 261,560
3 Claims. (Cl. 30—273)

This application is a continuation-in-part of application Serial Number 217,834, filed August 20, 1962, now abandoned entitled Carpet Cutting Machine.

This invention relates to a portable electric cutting tool for cutting carpet in preparation for installation or for trimming excess material from installed carpet. The use of the tool of this invention for cutting and trimming carpet is of particular advantage because of the ease and facility with which carpet padding or the like can be cut.

The tool of this invention is especially desirable for use with carpet installed with tackless carpet strip. It is necessary first to cut the carpet to approximate size before laying on the surface to be covered and then to secure one edge of the carpet and stretch the carpet toward the opposite end of the surface to be carpeted to provide a taut installation. All remaining edges of the carpet are then secured either by being pressed onto tack points projecting from the top of tackless carpet strip or by being nailed with the excess carpet material at the edges being trimmed to provide only sufficient material to tuck along the outside of the tackless strip or to meet the walls as the case may be. A uniform, neat finished installation is thus provided. The usual means for trimming carpet edges during installation is to use a manually operated scissors or knife. The task of trimming a carpet with scissors or knife is both exactly and time consuming. The cutting tool of this invention provides a fast, efficient, simple means for trimming the edge of a carpet during installation, or for cutting a carpet to approximate size in a workshop or elsewhere.

It is an object of this invention to provide a portable tool for cutting and trimming carpet.

It is another object of this invention to provide a cutting blade which combines a nibbling and knife action for cutting carpet.

It is another object of this invention to provide an adjustable width, reversible spacer for use in trimming carpet edges.

It is another object of this invention to provide a wheel mounted cutting tool for making straight cuts in carpet.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
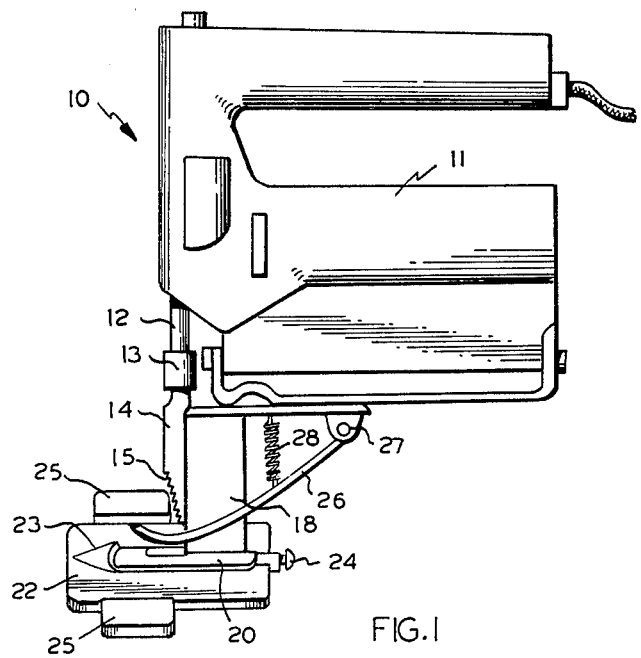
FIGURE 1 is a side elevation of a carpet cutting tool of this invention.

In FIGURE 1 is shown a portable electric cutting tool designated generally as 10, comprising an electric motor operated power tool 11 with reciprocating blade holder 12. The tool 11 with reciprocating holder 12 may be of conventional design and in itself comprises no part of this invention. Such tools are manufactured in a variety of sizes and for use herein a tool for use with sabre saws and adapted to operate on 115 volt alternating current using, for example, 1.8 amperes and line current of from 25–60 cycles is suitable. Such a tool may conventionally operate at about 3000 strokes per minute. For use herein a very rapid oscillating tool is preferred, such as one operating from 3000 strokes per minute to 6000 strokes per minute.

Figure 5:
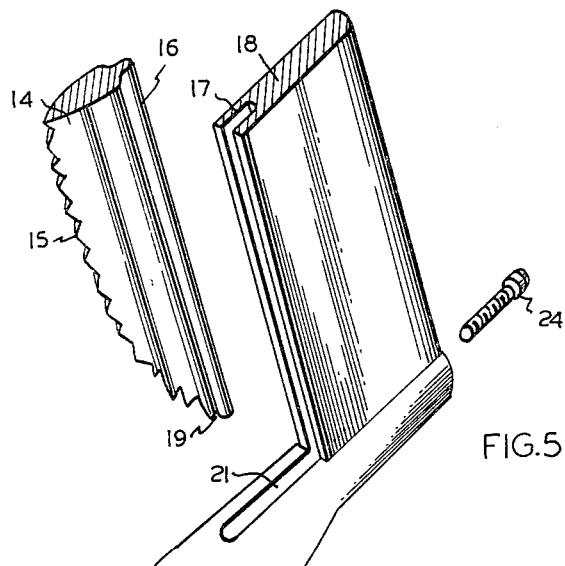
FIGURE 5 is an exploded perspective view in partial cut-away of the cutting head of the tool of this invention.

Oscillating blade holder 12 is provided with fixed collar 13 for retaining blade 14. Blade 14 is provided with serrations 15 at the front edge of the blade and is of narrowed cross-section at the rear as shown in FIGURE 5 so that the rear edge portion 16 of blade 14 may fit into channel 17 in blade guide member 18. The lower portion of blade 14 tapers so that serrations 15 along the front cutting edge provide blade point 19 at the lowermost extremity of blade 14. Point 19 is disposed at the reduced cross-sectional portion 16 of blade 14 and is disposed within channel 17 of blade guide member 18 at all times thereby preventing it from being caused to pierce goods, but rather causing it to saw goods by means of the sharpened front edge. Blade guide member 18 provides backing support to blade 14 against both longitudinal and transverse bending.

Blade 14 is configured with a relatively long narrow taper terminating in a point at its lowermost extremity. This configuration is desirable for providing a tool of moderate size and power which may be used for cutting relatively thick felted or looped fibrous material such as carpet or carpet padding. Such material will absorb exceedingly great amounts of impact energy from a blunted object such as a relatively blunt blade end or the like without being completely cut through or ruptured. If a blunt instrument is used, a great degree of fiber pulling will occur and the impact may be absorbed without the material being properly cut. Thus, cutting devices which are suitable for cutting light weight tightly woven natural fiber goods have proved to be eminently unsuitable for cutting carpet, particularly nylon carpet and the like wherein the fiber itself is extensible and tough and provides impact absorption in addition to that provided by fiber pulling. The ability of carpet or other napped goods to absorb impact is also greatly increased by the impossibility of compressing such goods firmly to prevent reciprocation of the goods with the cutting blade without greatly reducing the ease with which the blade can be advanced through the goods because of friction between the carpet and the holding means. It is, therefore, necessary in the disclosed means to provide a blade which is configured to act on a minimum number of fibers at a given instant and thereby exert the greatest cutting or rupturing force on each such fiber. This is best achieved by use of a serrated edge or a narrow pointed blade wherein the action of the blade is to cut the fiber of goods rather than pierce or impact the goods. Point 19 of blade 14 is therefore disposed in channel 17 where it cannot pierce goods being cut.

Foot portion 20 is disposed at the lower extremity of blade guide member 18 and comprises longitudinal slot 21, not shown, extending substantially therethrough for receiving point 19 and blade 14. Slot 21 in foot portion 20 extends rearwardly to the rear of channel 17 thereby providing a continuation of channel 17 into blade guide member 18 for operation of blade 14. Foot portion 20 is preferably sharply pointed at its foremost extremity as shown in FIGURE 5, but may be of blunted or other configuration as desired. A sharpened foot portion may be used for piercing a hole in carpet to begin a cut.

Rotatable spacer 22 is pivotally affixed to the end extremities of foot portion 20 so that member 22 will be freely movable to be partially rotated about the axis of foot portion 20. As shown, the foremost extremity of the foot portion provides a bearing point with conical cavity 23 of cutting guide member 22 providing a means for receiving the point of foot portion 20, and screw 24, inserted through an axial opening at the rear of member 22 and secured to the rear extremity of foot portion 20, providing a rearmost pivotal supporting means for member 22. Member 22 is a substantially flat member provided with extended ears 25 which are enabled to rotate freely about the axis of foot portion 20 through an arc approaching 180°. Carpet depressor 26 is pivotally attached by means of pivot 27 to tool 11 and is biased by means of compression spring 28 to abut foot portion 20. The unfixed end portion of member 26 is preferably bifurcated to extend on either side of blade guide member 18.

Figure 2:
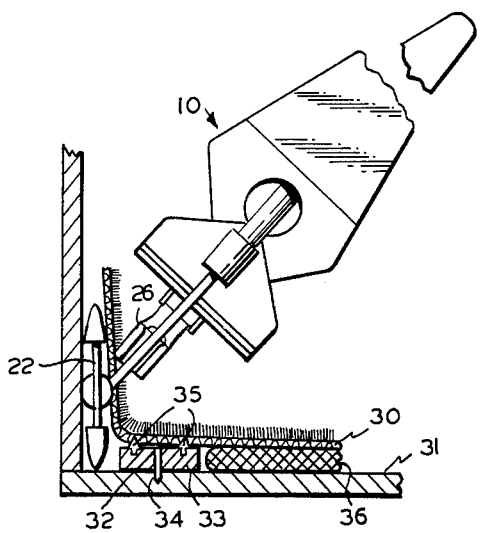
FIGURE 2 is a front elevation of the device of FIGURE 1 being used to trim the edge of a carpet installed with tackless carpet strips.
Figure 3:
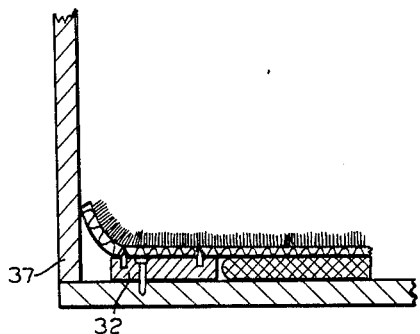
FIGURE 3 is a cross-sectional elevation of the carpet shown in FIGURE 2 after having been cut by the device of FIGURE 2.
Figure 4:
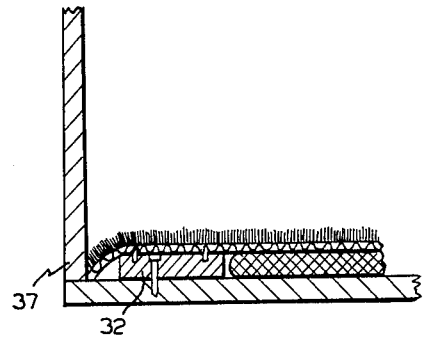
FIGURE 4 is a cross-sectional elevation of a finished installation of the carpet shown in FIGURE 3.

In FIGURE 2 is shown tool 10 of FIGURE 1 being used to trim the edge of carpet 30 installed on floor 31 by means of tackless installation strip 32. Tackless strip 32 is conventional and comprises a slat or lath-like strip 33 nailed to floor 31 by means of nails 34 and is provided with upstanding pointed tack projections 35 onto which carpet 30 is pressed and thereby secured. During the installation procedure, carpet pad 36 is first laid on the floor between tackless carpet strips 32, which are disposed along all edges of the room being carpeted and spaced therefrom a fraction of an inch. Carpet 30 is then laid by one edge of the carpet being pressed onto tackless strip 32 at one edge of the room and being stretched in well known manner from the secured edges whereupon the stretched carpet is then secured along all walls by being pressed onto the tackless strip. The excess material along the edge of the carpet is then trimmed by means of tool 10 as shown. Spacer 22, which acts as a cutting guide member, is inserted under the edge of the carpet material with the carpet material disposed between spacer 22 and depressor 26. The material is cut until spacer 22 is disposed with one edge in contact with floor 31 whereat the tool is disposed at the proper height for cutting a finished edge on carpet 30. The operator of tool 10 then proceeds around the entire room cutting the carpet by means of tool 10. The carpet after being cut appears as shown in FIGURE 3. The edge of the carpet is then depressed in the space between tackless strip 32 and wall 37 to provide a finished installation as shown in FIGURE 4.

Carpet may be cut without proceeding from the edge of the material by removing screw 24 as shown in FIGURE 5 to permit the removal of spacer 22 from foot portion 20. The pointed foremost extremity of foot portion 20 may then be pressed into the carpet at any point to pierce it, and tool 10 may then be operated without spacer 22. Such operation is desirable for cutting openings in carpet for receiving floor registers and the like.

Figure 6:
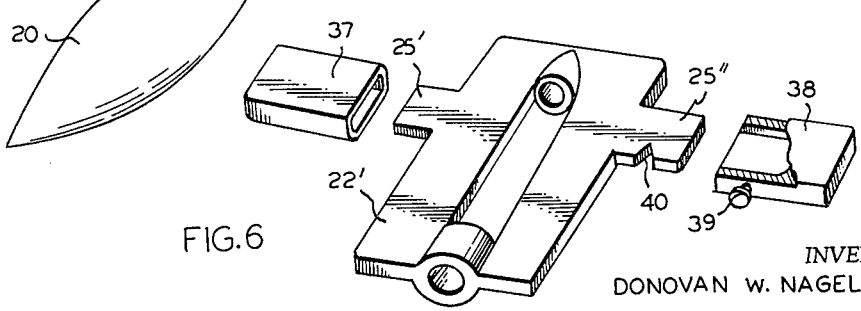
FIGURE 6 is a perspective view in partial section of the rotatable guide component of the embodiment of the invention shown in FIGURES 1 and 2.

In FIGURE 6 is shown spacer 22' provided with removable ear extension members 37 and 38. Member 37 may be press fitted onto ear 25' of spacer 22' and may be composed of nylon or other suitable material as may be desired. A slightly different snap-on configuration may be provided as shown in member 38, wherein a spring loaded stud 39 is provided to engage a cavity 40 in ear 25'' of member 38 as shown in FIGURE 6. When member 38 is to be removed, stud 39 is manually biased outwardly, thereby enabling member 38 to be removed. Various widths and configurations of snap-on cap members 38 similar to member 38 may be provided for use with various thicknesses and types of carpeting. As will be apparent, other embodiments of member 38 may be employed for snapping on, screwing on, or otherwise securing to a rug cutting guide member such as member 22'.

Figure 7:
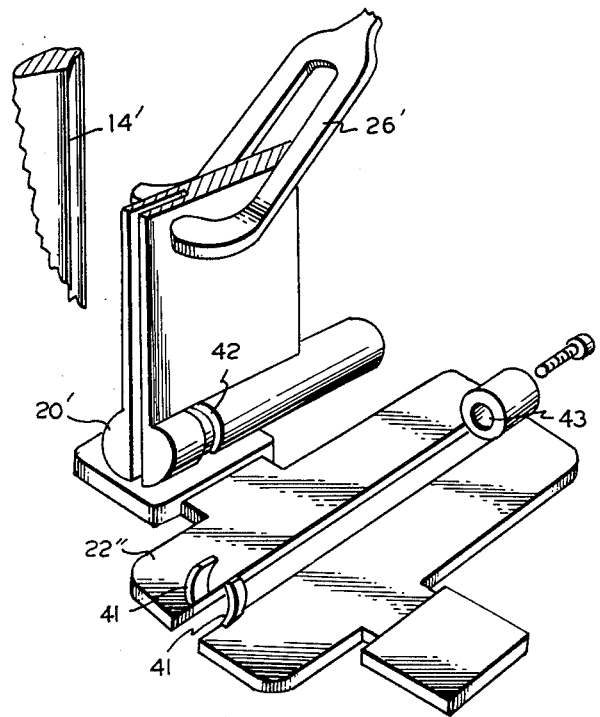
FIGURE 7 is an exploded perspective view of a modified embodiment of the device of the invention comprising a tool which can be used to cut carpet to the corners of a room.
Figure 9:
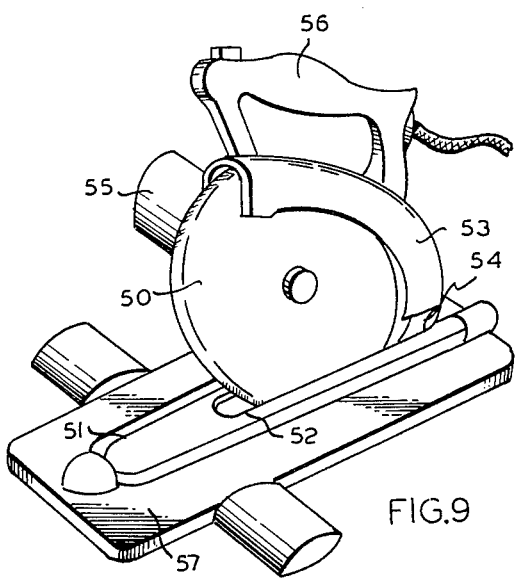
FIGURE 9 is a perspective view of another embodiment of the invention comprising a revolving cutting member.

In FIGURE 7 is shown a modification of the invention comprising blunted foot portion 20' and truncated cutting guide spacer 22''. As shown, spacer 22'' comprises snap ring portions 41 which snap into groove 42 in shoe portion 20'. It is preferred that spacer 22' be comprised of tempered spring metal so as to firmly grip shoe portion 20'. The rearmost bearing is similar to that shown in FIGURE 1 and comprises an axial opening 43 for receiving a screw which may be secured in the rearmost extremity of shoe portion 20'. The configuration of the apparatus shown in FIGURE 9 provides blade 14', which may be provided with a knife edge as shown, as the foremost member of those components in contact with the work piece, thereby enabling the tool to be used to cut to the corner extremities of a room. Carpet depressor 26' is configured similarly to the corresponding member shown in FIGURE 1, but does not extend ahead of blade 14', as is clearly shown in FIGURE 7.

Figure 8:
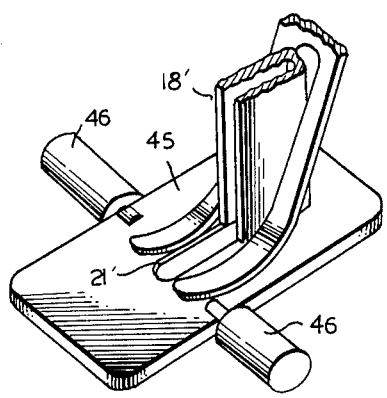
FIGURE 8 is a perspective view of an embodiment of the invention comprising a fixed guide component.

In FIGURE 8 is shown a modified embodiment of the invention comprising flat horizontal foot 45 fixedly attached to blade guide member 18'. Slotted opening 21' is provided in foot 45 to enable the blade (not shown) to extend into the foot member. If desired, slot 21' as shown, may be eliminated and the blade reciprocation adjusted so that the blade point will extend at its lowermost position of travel to near the upper surface of foot 45. However, it is preferred for the provision of optimum cutting action that the blade be traversed to a position as low as possible without damaging the surface upon which foot 45 is disposed. Rollers 46 are provided on foot 45 to increase the ease of advancing the tool under carpet being cut. The embodiment of FIGURE 8 is principally useful for use in the workroom rather than for carpet installation, although it will be understood that wheels 46 may be advantageously used instead of ear members 25 as shown in FIGURE 1 on a rug cutting guide attachment such as spacer 22 there shown.

In FIGURE 9 is shown another embodiment of the invention comprising a circular cutting wheel 50 such as a rotary saw blade or rotary knife. Shoe 51 is similar to shoe 20 of FIGURE 1, but slot 52 is elongated for receiving blade 50, and member 53 is integral with shoe 51. Member 53 is preferably channeled to receive the edge of blade 50, but need not necessarily be so configured if the blade is elevated so as not to contact shoe 51. The lowermost extremity 54 of member 53 is of substantially no greater width than blade 50 so as to increase the ease with which carpet may be cut. Motor 55 may be directly connected to blade 50 or may be connected thereto by means of gearing or the like as may be desired. Handle 56 is shown for holding the device. The tool shown in FIGURE 9 may be similar to that of well known radial saw hand tools. It may be desired to provide that rug cutting guide member 57 be rotatable in one direction only to prevent motor 55 from being brought into contact with a wall surface or the like. A carpet depressor, such as member 26 of FIGURE 1, need not be provided with the embodiment of FIGURE 9 when blade 50 is rotated in a counterclockwise direction relation to the illustration of FIGURE 9; such rotation causes the carpet material being cut to be pressed against shoe 51 thereby eliminating the need for a depressing device.

Figure 10:
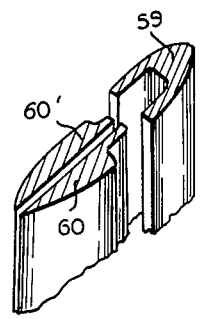
FIGURE 10 is a perspective view in section of a portion of another embodiment of a cutting member of this invention.

In FIGURE 10 is shown another embodiment of a blade for a device of this invention comprising blade guide member 59 and blades 60 and 60'. Blades 60 and 60' are of symmetrical construction and in combination are configured to provide substantially the same cross-sectional profile as blade 14 of FIGURE 1. Blade portions 60 and 60' may be reciprocated simultaneously in opposite directions to provide maximum speed of cutting. The adaptation of a tool for reciprocating blade 60 and 60' in opposite directions will be apparent to one skilled in the art.

Figure 11:
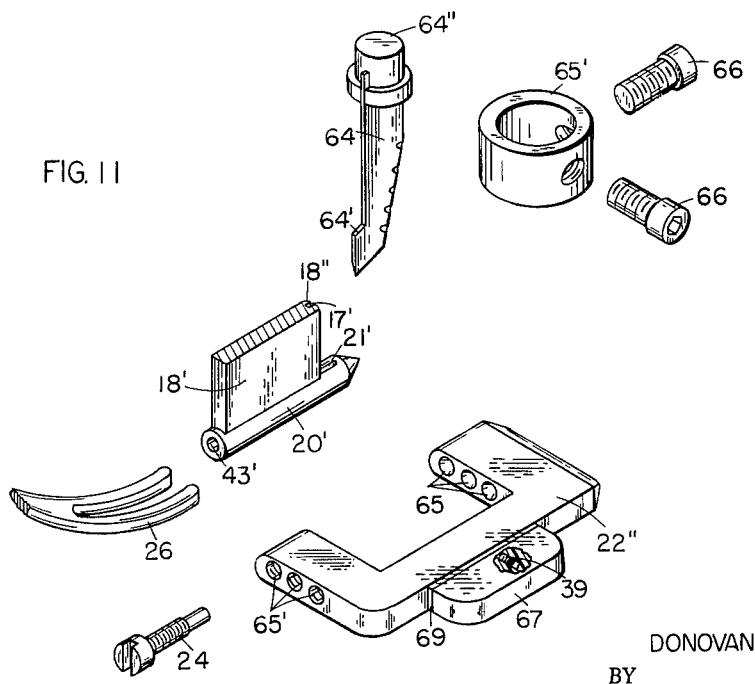
FIGURE 11 is an exploded perspective view in partial cut-away of another embodiment of a cutting head of this invention incorporating a pivotal foot member.

In FIGURE 11 is shown in exploded perspective view a modification of the invention wherein blade 64 is configured with a plurality of ground notches in the otherwise smooth sharpened front edge thereof. The front edge of blade 64 is tapered downwardly and rearwardly with the lowermost extremity of the blade being angled sharply rearwardly. The front edge of the blade is spaced back from the front of slot 21' preferably about .030 inch when the blade is at the top of its stroke and spaced to just clear the front wall of the slot when the blade is at the bottom of its stroke. The blade action is one of combined nibbling and cutting of the carpet material, the setting of the blade being such that the material being cut is not pulled into slot 61 but is alternately cut and chewed by the blade with individual strand loops being caught by the notches and cut by the knife edge. Minimum impact absorption by carpet which is not cut is encountered by the blade of this design. Blade 64 can be sharpened, if necessary, by using a sharpening stone or grinding wheel on one side only of the front knife edge.

The lower rearmost extremity 64' of blade 64 extends rearwardly a greater distance than the remainder of the blade and is the only portion of the blade to be disposed in channel 17' of guide member 18'. The channel is self-cleaning when used with blade 64.

The topmost portion of blade 64 is shown integral with cylindrical post 64" but may be affixed in any other operable manner as desired. Collar 65' fits over a reciprocating driving member (not shown) of the tool and set screws 66 are passed through the driving member into frictional engagement with post 64". Any other operable chucking arrangement may be used as desired.

Guide member 18' is wider than blade 64 and is preferably bevelled at its foremost extremity 18" as shown thereby removing the shoulders which would otherwise exist at the front edge of the guide member to reduce resistance in passing the tool through carpet being cut. Guide member 18' is slightly wider than blade 64, but is desirably of no greater transverse width than is necessary to provide a channel for receiving the rearmost portion of blade 64.

The foremost extremity of foot 20' is sharply pointed for use either in piercing carpet to be cut as described above or for providing a bearing for being received in one of conical bottomless holes 65 in spacer 22" as shown. Screw 24 can be threaded into a corresponding hole 65' at the rear of spacer 22" with the unthreaded journalled end extremity of screw 24 being received in hole 43' at the rear of foot 20' to provide a bearing surface for foot 20'. Projection 67 may be provided on the side of spacer 22" and affixed thereto by means of screws 39' as shown. Shims 69 may be added to provide fine control of the width setting. It is possible to turn spacer 22" about foot 20' so that it may be disposed on either side thereof without lifting depressor foot 26, the latter member being able to ride upward and over the spacer from one face theerof to the other when the spacer is flipped from one side of foot 20' to the other.

The stroke of the reciprocating plunger tools which are described for use herein are usually of the order of ½ to ¾ inch, and the notched front edge of the blade may extend for a similar distance to provide optimum cutting action.

Figure 12:
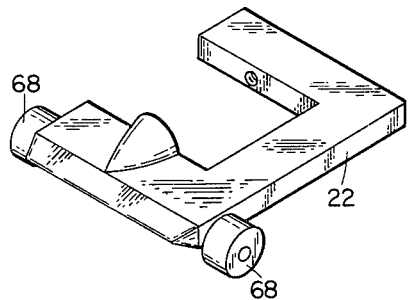
FIGURE 12 is a perspective view of another embodiment of a portion of the cutting head of FIGURE 11.

In FIGURE 12 is shown a modification of spacer 22" of FIGURE 5. Spacer 22"' is similar to that of FIGURE 5, but is provided with a pair of wheels 68 disposed on either side the spacer. The wheels are covered with rubber or other material which will prevent side slipping of the spacer when the cutting tool is pushed along a floor surface. Spacer 22"' is of relatively greater height in front so that carpet is raised from the floor a greater distance than shown in FIGURE 5 thereby enabling all of the notch-like blade serrations to act on the carpet and provide optimum cutting action.

Figure 13:
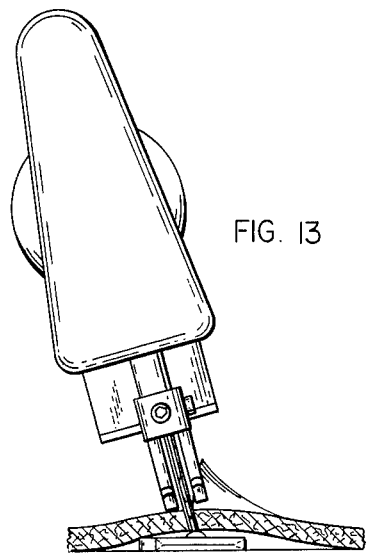
FIGURE 13 is a front elevation of a tool of this invention equipped with the pivotal foot member of FIGURE 11 being used to cut carpet on a floor surface.

In FIGURE 13 is shown a tool of this invention provided with the spacer of FIGURE 11 which is being used to cut carpet laid on a floor surface. The cutting tool is desirably held at a slight angle to vertical as shown to provide optimum cutting action. The action of the tool when used in this way is similar to that obtained by a scissors where the material being cut is raised on one side of the cut while material on the other side of the cut lies flat. The separation of material on either side of a cut enhances the ease with which the material can be cut. The provision of the pivotally mounted spacer enables the tool to be tilted to provide optimum scissors-like separation of cut material using a cutting action which is a combination of knife cutting and nibbling. The bevel cut also provides a neater, less ragged edge on the carpet than would a vertical cut.

Figure 14:
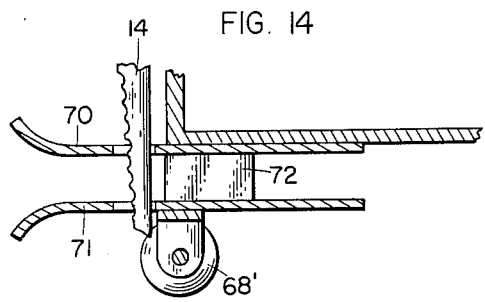
FIGURE 14 is a perspective view of another embodiment of a cutting head of a tool of this invention.

In FIGURE 14 is shown another embodiment of a cutting head of a tool of this invention which is non-rotatable. For use of a tool of this invention on a flat surface of larger size than the size of the carpet to be cut, it is not essentially necessary to tilt the tool in use, and therefore, a rotatable spacer need not be provided. In the embodiment of the invention shown in FIGURE 8 upper plate 70 and lower plate 71 are fixedly attached to vertical support member 72. Support member 72 is affixed to the frame of a power unit, not shown, so that a single unitary structure is provided. Blade 44 is located forward of support member 72. The blade tip need not be disposed in a recess in the support member in the embodiment of FIGURE 8 because the blade may be set low enough so that the tip is not withdrawn from the material being cut during the reciprocal stroke of the blade. Wheels 68' are disposed below plate 71 and provide sufficient clearance below the plate for the reciprocal motion of the blade tip, this being usually no more than ½ to ¾ inch. Carpet is readily cut in a workroom by the machine shown in FIGURE 8 where it is not necessary to trim adjacent a wall surface.

All of the described embodiments of the invention are suitable for cutting soft goods other than carpet such as carpet padding made from rubberized hair felt and the like. The tool of this invention is particularly suitable for cutting material comprising tough heavy stranded fiber as used for backing carpet. It is conventional to cut tough fibrous material by placing the material to be cut on a firm base and passing a blade downward though the material. During the downward stroke the material, particularly if relatively structurally rigid, is not able to be displaced by motion of the blade, and maximum cutting action and minimum impact absorption is obtained. It is not necessary to exert force downward on the material being cut if the blade motion is continuously downward, as for example, in a band saw, but it becomes necessary to exert force downward on the material being cut if the blade reciprocates, as in a jigsaw, for example, to prevent the material being cut from vibrating or even from sticking to the blade so as to render the operation impractical if not destructive to material and equipment. With relatively rigid materials it is possible in some degree to manually exert force downward and simultaneously move the cutting blade through the material being cut, but with soft goods this becomes impractical. A heavily loaded spring actuated depressing foot may be used similar to that used on sewing machines to prevent soft goods, usually fabric, from fouling the blade or needle as the case may be, but the provision of a strongly actuated depressing foot prevents the machine from cutting material at an angle other than normal to the surface of the goods. The machine of this invention avoids these limitations; i.e., of either providing a machine with blade that either moves continuously downward or one which is provided with a firmly biased depressing foot, by tapering the leading edge of the blade rearwardly so that on the upstroke of the blade the blade edge is clear of the material being cut thereby obviating the necessity for a depressing foot of any kind (the ones shown herein are not necessary for operation, but are convenient for visually guiding the tool along a line to be cut) and enabling the tool to be used at any desired angle. It is therefore necessary that the cutting edge of the blade not be parallel with the direction of reciprocal movement, but be tapered rearwardly from top to bottom with respect thereto. The blade construction shown herein provides a tool using a simple fixed direction reciprocal cutting motion free of oscillatory motion with the capability of cutting fibrous material at any edge angle and without use of a depressor foot, if desired, at relatively low blade speeds such as may be provided by a single pole motor operating on 60 cycle current reciprocating a blade through a stroke of ½ inch to ¾ inch at speeds of up to 3300 reciprocations per minute. The blade speed of such a device is a small fraction of a similar larger tool using a stroke several inches in length as will be apparent. Obviously, the greater the blade speed, the less taper will be required in the leading edge of the blade to accommodate the said rate of feed of material to be cut to the cutting edge. A small tool of this invention can be used in close quarters such as in corners of rooms and along edges of floors with ease and at speeds of several feet per minute in carpet; i.e., 6 to 18 feet per minute, and is much superior to a larger similar machine using higher blade velocities with a blade that is not self clearing and which would be operable at a rate of possibly 1 to 3 feet per minute. The rear edge design of the blades of this invention are superior in providing not only self cleaning action in the channel guideway, but in reducing friction of the blade in the guideway to a minimum.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. In a reciprocally operated portable electric machine, an improvement for rapidly cutting without raveling taut scrim backed, resiliently extensible fiber pile carpeting to provide cut scrim and pile edges free of oscillatory tear and fiber pulling, said machine comprising an electric drive motor, frame, and reciprocally driven output member, said improvement comprising in combination a cutting blade disposed to depend from said output member and be attachable thereto, said blade being reciprocally driven through substantially at least one-half inch of linear movement at substantially at least 3000 strokes per minute, and being configured with a sharpened edge foremost wherein said edge comprises alternately disposed knife sharpened indentations, and knife sharpened substantially straight edge sections, each said straight edge section being at least substantially as great in dimension along said blade edge as each said indentation, at least a working portion of said blade edge being disposed rearward at a slight angle with respect to the direction of reciprocation, said portion of said blade edge being coplanar and non-parallel with said direction of reciprocation, a fixed standard for receiving goods to be cut configured with a depending post portion having relatively narrow dimension transverse to the direction of travel through goods to be cut and disposed in rearward alignment with said blade, and with a foot portion incorporating a spacer embodiment at least forwardly extending from said post portion, said standard having an opening extending thereinto and configured to receive said blade in all positions of blade movement, said spacer embodiment comprising low frictional coefficient means for passing along floor and wall surfaces with the projected distance between the top and the bottom of said foot portion and spacer embodiment being greater than the projected distance between next adjacent indentations in said blade edge, thereby operably enabling said machine to be passed along floor surfaces during operation.

2. The article of claim 1 wherein said spacer embodiment is of substantially planar configuration with foremost and rearmost transverse portions being integral with a laterally asymmetric longitudinal portion, said forward portion being adapted to be pivotally mounted on the front of said foot portion, said rearward portion being adapted to be pivotally mounted on the rear of said foot portion, said spacer member being pivotally mounted thereby and rotatable about an axis disposed longitudinally through said foot portion.

3. The article of claim 1 wherein said spacer embodiment comprises wheel means rotable about an axis transverse to the longitudinal axis of said foot portion.

References Cited by the Examiner

UNITED STATES PATENTS

| 693,306 | 2/1902 | Peckover | 125—18 |
| 841,325 | 1/1907 | King | 30—273 |
| 1,592,679 | 7/1926 | Ulrich | 30—346 X |
| 2,015,535 | 9/1935 | Sacrey | 30—272 |
| 2,239,291 | 4/1941 | Martin | 30—273 |
| 2,575,695 | 11/1951 | Ulrich | 30—273 |
| 2,623,283 | 12/1952 | Godfrey et al. | 30—273 X |
| 2,695,522 | 11/1954 | Papworth. | |
| 2,845,706 | 8/1958 | Aciego | 30—346 |
| 2,930,123 | 3/1960 | Clark | 30—273 |

FOREIGN PATENTS 1,061,058  11/1953  France.

WILLIAM FELDMAN, *Primary Examiner.*

M. HENSON WOOD, Jr., *Examiner.*